March 22, 1960  M. KOLEDA ET AL  2,929,858
EXHAUST HOODS FOR ELECTRIC ARC FURNACES
Filed Sept. 13, 1956  2 Sheets-Sheet 1

INVENTORS
Martin Koleda
František Mrazek
BY Richard Lloyd
Ag't

March 22, 1960  M. KOLEDA ET AL  2,929,858
EXHAUST HOODS FOR ELECTRIC ARC FURNACES
Filed Sept. 13, 1956  2 Sheets-Sheet 2

INVENTORS
Martin Koleda
František Mrázek

United States Patent Office 2,929,858
Patented Mar. 22, 1960

2,929,858

EXHAUST HOODS FOR ELECTRIC ARC FURNACES

Martin Koleda, Novaky, and Frantisek Mrazek, Radotin, Czechoslovakia, assignors to Závody Rudych Letnic 1930, Národní Podnik, Radotin, near Prague, Czechoslovakia, a company of Czechoslovakia Application September 13, 1956, Serial No. 609,730

3 Claims. (Cl. 13—9)

This invention relates to electric arc furnaces, and more particularly is directed to hoods for receiving smoke and other fumes issuing from such furnaces during the operation thereof.

It is well known that smoke and other fumes steadily issue from electric arc furnaces during the operation thereof and, if not removed from the vicinity of the furnaces, may endanger the health of persons working near the furnaces. Heretofore, attempts have been made to remove such toxic, or at least noxious, fumes from the area around an electric furnace by providing a hood above the latter which has a large bottom opening that is at least coextensive with the furnace and which is joined, usually at the center of the top of the hood, to a conduit of relatively small cross-section leading to the inlet of a suitable exhaust blower so that the latter creates a suction or low pressure in the conduit for inducing the smoke or fumes in the atmosphere surrounding the furnace to enter the hood for discharge from the latter through the conduit extending to the exterior of the building containing the furnace. However, with the above described exhaust hood arrangement, the suction effect is not uniform across the bottom opening of the hood, being greater at the center than at the edges, so that considerable quantities of smoke and fumes still escape under the edges of the hood and contaminate the surrounding atmosphere. Moreover, merely increasing the capacity of the exhaust blower associated with the discharge conduit extending from the hood does not remedy the above mentioned deficiency of the existing exhaust hoods.

Accordingly, it is an object of the present invention to provide exhaust hoods that may be disposed above electric arc furnaces and the like and that are effective to substantially completely carry away the smoke and fumes issuing from the latter.

In accordance with an aspect of the invention, the foregoing object may be achieved by providing an exhaust hood having two spaced apart top walls forming a double ceiling, with the discharge conduit communicating with the space between the top walls and with the lower one of the top walls having an evenly distributed series of slots or apertures therein resulting in a uniform suction effect across the entire hood.

The above, and other objects, features and advantages of the invention will be apparent in the following detailed description of illustrative embodiments thereof which is to be read in connection with the accompanying drawings forming a part hereof, and wherein.

Figure 1:
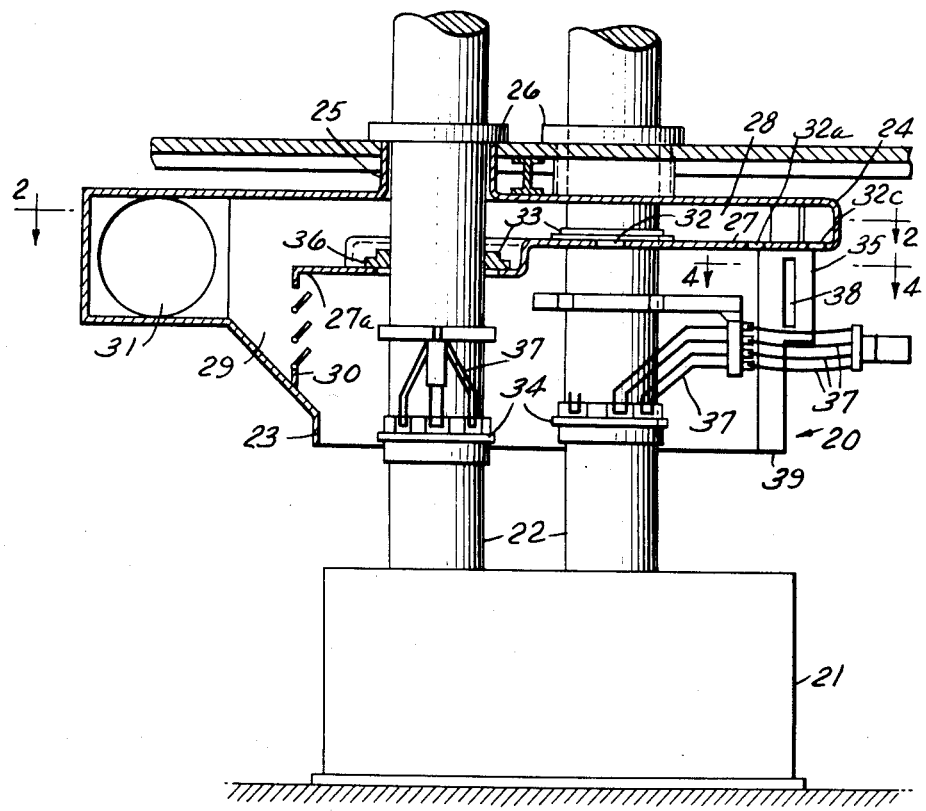
Fig. 1 is a vertical sectional view of an exhaust hood according to the invention.
Figure 4:
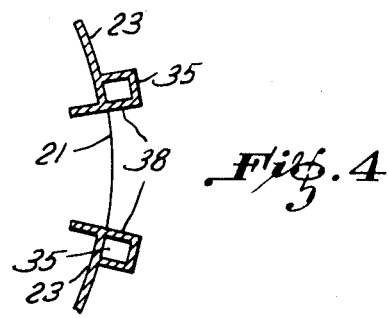
Fig. 4 is a horizontal sectional view taken along the line 4—4 of Fig. 1.
Figure 2:
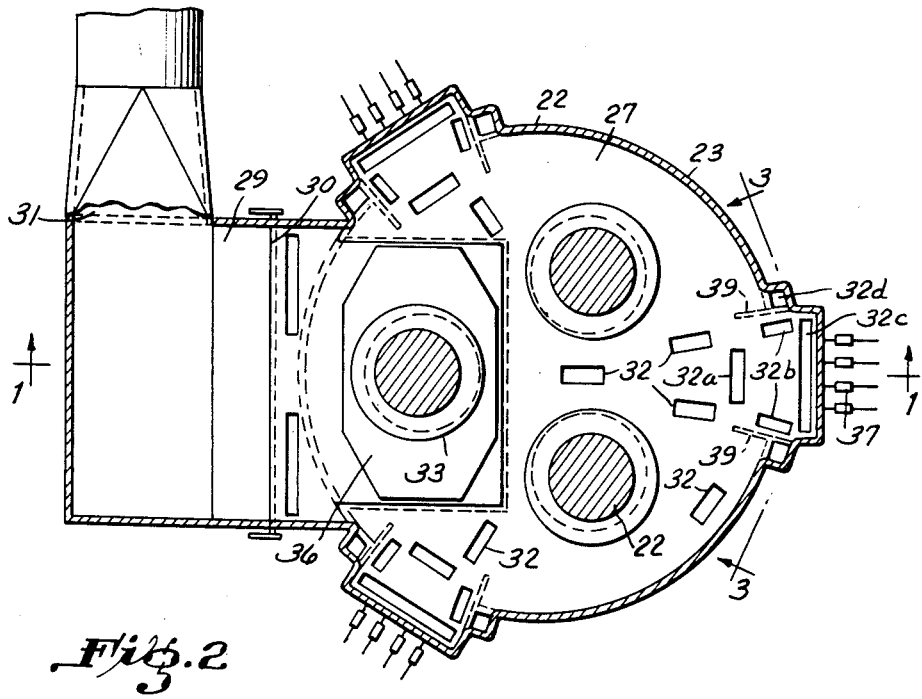
Fig. 2 is a horizontal sectional view taken along the line 2—2 of Fig. 1.
Figure 3:
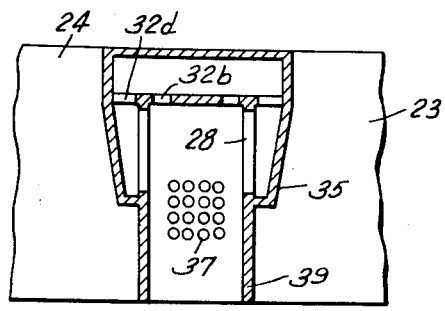
Fig. 3 is a vertical sectional view taken along the line 3—3 of Fig. 2.

Referring now to Figs. 1, 2, 3, and 4, a hood embodying the present invention and generally identified by the reference numeral 20 is there illustrated and is particularly adapted for association with an electric arc furnace 21 of the kind having vertical electrodes 22 that are continuous or uninterrupted and, therefore, must extend through the hood 20. As shown in the drawings, the hood 20 includes a generally cylindrical, vertically extending side wall 23 that is substantially coextensive, in plan, with the associated furnace 21. The hood 20 is open at the bottom thereof, and includes an upper top wall 24 extending across the upper end of side wall 23 and having openings 25 therein through which the electrodes 22 can extend. Suitable packings 26 are provided for sealing the clearance between the electrodes 22 and the edges of the top wall 24 at the openings 25.

Disposed below the top wall 24, and also extending across the vertical side wall 23 is a lower top wall or false ceiling 27 having openings for the electrodes 22 and which cooperates with the upper top wall 24 to define a space 28 therebetween. At one side of the side wall 23 is a discharge chamber 29 which, at the top, communicates with the space 28, and which also communicates with the space within side wall 23 below the false ceiling 27 through louvres 30 in the side wall. A discharge conduit 31 extends from the chamber 29 and is adapted for connection to the inlet of an exhaust blower or fan (not shown) which exhausts to the exterior of the building or other structure housing the furnace 21 and is adapted to create a low pressure or vacuum within the conduit 31.

Further, the false ceiling or lower top wall 27 of the hood 20 has a number of openings 32a, 32b, 32c and 32d therein distributed over its entire area, so that, the low pressure in conduit 31, communicated to the space 28 by way of the chamber 29, is effective over the entire area of the hood to adequately exhaust toxic or noxious gases and fumes entering the hood at the open bottom of the latter. Further, in the hood 20, gases and fumes are directly exhausted from the hood below the false ceiling 27 through the louvres 30.

Where it is important to limit the vertical dimensions of the hood 20, the false ceiling 27 is preferably stepped downwardly in the direction toward the side of the hood opening into chamber 29, for example, as at 27a, so that the height of the space 28 will increase in the direction toward the outlet therefrom to accommodate the progressively increasing volumes of gases and fumes flowing toward the outlet from the several openings 32, 32a, 32b, 32c and 32d. A cover plate 33 may be provided on each of the electrodes 22 to rest on the false ceiling 27 for normally closing the opening in the latter receiving the related electrode, and each cover plate is adapted to be lifted from the false ceiling in response to engagement by a flange or collar 34 on the related electrode during the final upward vertical movement of the latter. The electrode 22 near to the chamber 29 is preferably provided with a second cover plate 36 under the cover plate 26 in order to facilitate adjusting of the electrode.

Finally, the hood 20 includes suction boxes 35 disposed on the outside of wall 23 and having baffles therein defining inverted U-shaped passages therethrough (Fig. 5) which open downwardly, at one side of the baffles, to the exterior of the hood, and, at the other side of the baffles, into the hood below false ceiling 27, while such passages also open, at the top, by openings 32d into space 28. Further, each box 35 has slots 38 in the radial walls 39 (Fig. 5) thereof for the admission of external air. Thus, electric cables 37 for supplying current to the electrodes 22 can be led through the inverted U-shaped passages of boxes 35 into the interior of the hood 20, and the described structure operates to induce a flow of pure air through the above mentioned slots in the radial walls of each box, and upwardly into the space 28, thereby to prevent the escape of gases and fumes from the hood 20 around the entrances for the electric cables.

Although particular illustrative embodiments of the invention have been described in detail herein and shown in the accompanying drawings, it is to be understood that the invention is not limited to those precise embodiments, and that various changes and modifications may be effected therein without departing from the scope or spirit of the invention, except as defined in the appended claims.

What is claimed is:

1. A hood for exhausting gases and fumes escaping from an electric arc furnace and the like, comprising a downwardly opening hood structure constructed for mounting above an electric arc furnace and the like and including a side wall of substantial vertical extent, an upper top wall and a lower top wall spaced a substantial distance upwardly from the lower edge of said side wall, said lower top wall being coextensive with the largest horizontal cross-sectional area of said hood and defining a false ceiling with a space between said upper and lower top walls, and a discharge conduit communicating at least with said space of the hood structure and constructed for connection to a source of low pressure, said lower top wall having openings therein distributed over the area of said lower top wall so that, when a low pressure is established in said conduit and communicated with said space, a flow is induced upwardly through said openings into said space for drawing gases and fumes, escaping from a furnace below the hood structure, uniformly into the open bottom of the hood structure across the entire area of the latter, said upper top wall and false ceiling having vertically aligned openings therein for receiving the electrodes of an electric arc furnace disposed below the hood structure, said hood further comprising cover members constructed to extend around the electrodes and lying loosely on said ceiling to normally close the openings of the latter through which the electrodes extend.

2. A hood as in claim 1; further comprising box-like structures of inverted U-shape on the outside of said hood structure and each defining a downwardly and radially outward opening space, said hood structure having radial openings to receive electric cables for supplying current to the electrodes which are led through said space defined by each box-like structure, each of said box-like structures including inner and outer walls defining an interior, said box-like structure having openings communicating said interior with said space between the upper and lower top walls of the hood structure, and said inner wall of each box-like structure further having slots communicating said interior with said downwardly and radially outward opening space to induce a flow of air from the latter into said interior, thereby to prevent the escape of gases and fumes from the hood structure through said radial openings receiving the electric cables.

3. A hood as in claim 2; wherein said conduit communicates with said space at one side of the latter and said false ceiling is stepped downwardly in the direction toward said one side of the space so that the latter is constructed to accommodate the flow from said openings which increases in volume in the direction toward said one side.

References Cited in the file of this patent

UNITED STATES PATENTS

| | | |
|---|---|---|
| 852,650 | Cannon | May 7, 1907 |
| 1,589,831 | Bartholomew | June 22, 1926 |
| 2,247,892 | Schneible | July 1, 1941 |
| 2,268,918 | Allan et al. | Jan. 6, 1942 |
| 2,334,275 | Micelat | Nov. 6, 1943 |
| 2,402,190 | Van der Pyl et al. | June 18, 1946 |
| 2,426,643 | Ridgway | Sept. 2, 1947 |
| 2,627,220 | Morrow | Feb. 3, 1953 |